United States Patent [19]

Bansal et al.

[11] Patent Number: 4,994,700
[45] Date of Patent: Feb. 19, 1991

[54] DYNAMOELECTRIC MACHINE OIL-COOLED STATOR WINDING

[75] Inventors: Madan L. Bansal; Barry J. Parker, both of Rockford, Ill.

[73] Assignee: Sundstrand Corporation, Rockford, Ill.

[21] Appl. No.: 480,662

[22] Filed: Feb. 15, 1990

[51] Int. Cl.⁵ .................... H02K 9/197; H02K 3/24
[52] U.S. Cl. .................... 310/215; 310/54; 310/60 A
[58] Field of Search ............... 310/54, 214, 215, 266, 310/60 A, 254

[56] References Cited

U.S. PATENT DOCUMENTS

| | | | |
|---|---|---|---|
| 3,727,085 | 4/1973 | Goetz et al. | 310/54 |
| 3,780,325 | 12/1973 | Frankenhauser | 310/214 |
| 4,369,389 | 1/1983 | Lambrecht | 310/214 |
| 4,514,652 | 4/1985 | Olson | 310/54 |
| 4,900,956 | 2/1990 | Gavilondo et al. | 310/60 A |

FOREIGN PATENT DOCUMENTS

| | | | |
|---|---|---|---|
| 1095108 | 2/1981 | Canada | 310/214 |
| 1044574 | 10/1966 | United Kingdom | 310/214 |

*Primary Examiner*—Steven L. Stephan
*Assistant Examiner*—D. L. Rebsch
*Attorney, Agent, or Firm*—Wood, Phillips, Mason Recktenwald & Vansanten

[57] ABSTRACT

The problem of stator cooling in a dynamoelectric machine is resolved using manufacturing spaces (32) within stator slots (20) for flow of oil coolant. In order to secure stator winding conductors (30) within the slots, a spring wedge (36) provides a biasing force for biasing the conductors against movements within the slots.

12 Claims, 2 Drawing Sheets

DYNAMOELECTRIC MACHINE OIL-COOLED STATOR WINDING

FIELD OF THE INVENTION

This invention relates to dynamoelectric machines and, more particularly, to stator cooling thereof.

BACKGROUND OF THE INVENTION

A conventional dynamoelectric machine comprises a housing and an elongate cylindrical stator within the housing having a plurality of stator slots carrying a stator winding. A rotor is received in a bore in said stator and is rotational relative thereto.

In order to increase efficiency, such dynamoelectric machines have employed liquid cooling of electrical components. The most effective method of cooling is to bring the liquid, such as oil, into direct contact with the heat producing parts. This is accomplished in a rotor by pumping the oil axially through the rotor windings so as to bring the oil into intimate contact with every part of every field winding conductor. A typical rotor is totally enclosed within a sleeve so as to contain this portion of the cooling within the field windings.

Stator, or armature, windings are typically cooled by spraying oil directly onto the end windings from jets in the rotor. This scheme does not provide direct cooling to the portion of the windings within the stator slots. The spray cooling method results in free oil in the generator interior, which results in power losses caused by the drag of the oil entrapped between the rotor and the stator. This system of cooling is effective only with a shorter core length. Alternatively, back iron cooling provided in the stator housing can be used. This form of cooling relies on conduction from the stator winding conductors to oil channels in the stator housing, through the stator slot insulation and the magnetic iron core, both of which have low thermal conductivity.

A preferred structure for cooling armature windings would apply the principal of the rotor field axial flow cooling, discussed above. Such structure would require the pumping of cooling oil from one end winding to the other through the stator slots. However, the armature windings are impregnated with a suitable varnish, or epoxy resin, to secure the windings against vibration, which might be caused by the alternating electromagnetic forces resulting from the alternating currents within the windings. Such vibration must be suppressed to prevent chafing wear of the winding conductor insulation. This problem does not occur with the field winding which carries direct current rather than alternating current.

The present invention is directed to overcoming one or more of the problems as set forth above.

SUMMARY OF THE INVENTION

In accordance with the invention, a dynamoelectric machine is provided with elastic means for biasing a stator coil against movement and to provide spaces in the stator slots to provide liquid coolant therethrough.

Broadly, there is disclosed herein a dynamoelectric machine comprising a housing and an elongate cylindrical stator within the housing, the stator having a plurality of longitudinally extending, angularly spaced slots. A stator coil comprises an electrical conductor wound in the stator slots, whereby the conductor only partially fills the slots to provide longitudinally extending spaces in each of the slots. Elastic means are provided for biasing the conductor against movement in each of the slots. Means provide liquid coolant to the stator so that the coolant flows through the spaces in the slots to provide direct cooling to the coil.

According to one aspect of the invention, the elastic means comprises a spring wedge associated with each said slot for radially inwardly biasing the portion of the conductor extending through the slot.

It is a feature of the invention that the spring wedge comprises an elongate wavy spring wedge.

According to another aspect of the invention, the elastic means comprises a spring wedge associated with each said slot for angularly biasing the portion of the conductor extending through such slot.

It is a further feature of the invention that the elastic means extends longitudinally through the length of each slot.

According to yet a further aspect of the invention, the elastic means comprises a corrugated slot liner surrounding the portion of the conductor extending through each slot.

There is disclosed herein according to another aspect of the invention a stator cooled dynamoelectric machine including a housing, and an elongate cylindrical stator within the housing and having a central rotor receiving bore, the stator having a plurality of longitudinally extending, angularly spaced slots opening radially inwardly to said bore. A stator can seals the bore to close off the radially inwardly openings from the slots. A stator coil comprises an electrical conductor wound in the stator slots, whereby the conductor only partially fills the slots to provide longitudinally extending spaces in each of the slots. Elastic means are provided for biasing the conductor against movement in each of the slots. Means provide liquid coolant to the stator so that the coolant flows through the spaces in the slots to provide direct cooling to the coil.

The disclosed invention relates to providing cooling to the stator windings in a dynamoelectric machine. The stator includes stator slots receiving the windings. The windings are surrounded by slot liners to protect the windings from sharp edges of the laminations of the stator core.

Normally, the stator is dipped in a varnish so that the varnish impregnates the slots and surrounds the windings to eliminate vibration. Consequently, it is not possible to provide direct cooling to the conductors.

In accordance with the invention, the necessary manufacturing clearances and tolerances provided within the slot are used as an oil flow passage. Particularly, the armature winding conductors are secured against movement by the use of suitable elastic materials, such as elastic corrugated slot liners or spring wedges. Further, the interior of the stator is sealed using a suitable can.

The spring wedges may comprise channel section spring wedges which bias the windings radially inwardly, or bias the conductor angularly. Alternatively, the wedge may comprise a wavy spring wedge for biasing the conductors radially inwardly. Lastly, the conventional slot liner could be replaced with a special corrugated elastic slot liner. Deformation of the corrugations on assembly provides the constraining forces on the conductors. The corrugations also provide the cooling oil channels.

Further features and advantages of the invention will readily be apparent from the specification and the drawings.

DESCRIPTION OF THE INVENTION

Figure 1:
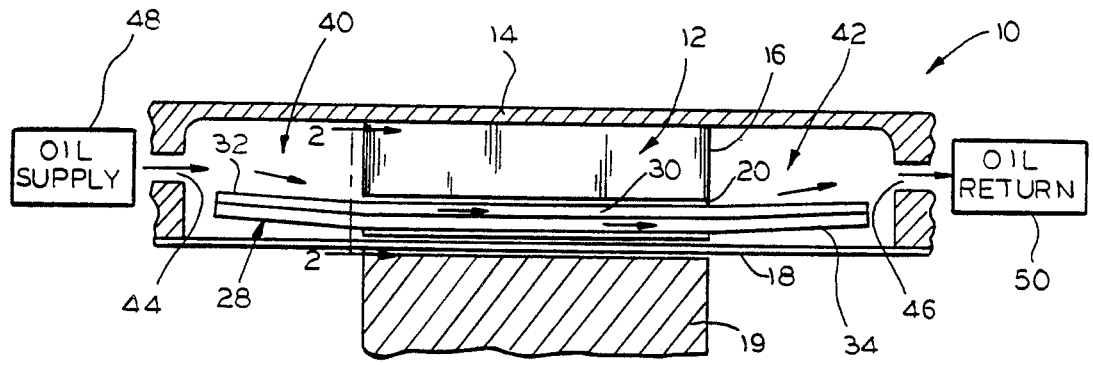
FIG. 1 is a sectional view of a dynamoelectric machine having stator cooling apparatus according to the invention.

With reference to FIG. 1, a dynamoelectric machine in the form of an electrical generator 10, including a stator 12 cooled according to the invention, is illustrated.

The generator 10 includes an elongated, generally tubular housing 14. Radially inwardly of the housing 14 is the stator 12. The stator 12 includes a core 16 comprising a laminated stack, as is conventional, to define an elongate cylindrical core structure. The core 16 has a central rotor receiving bore 18 for receiving a rotor 19. The rotor 19 may be a wound rotor or a permanent magnet rotor. Although not shown, means are provided for rotating the rotor 19 relative to the stator 12.

Figure 2:
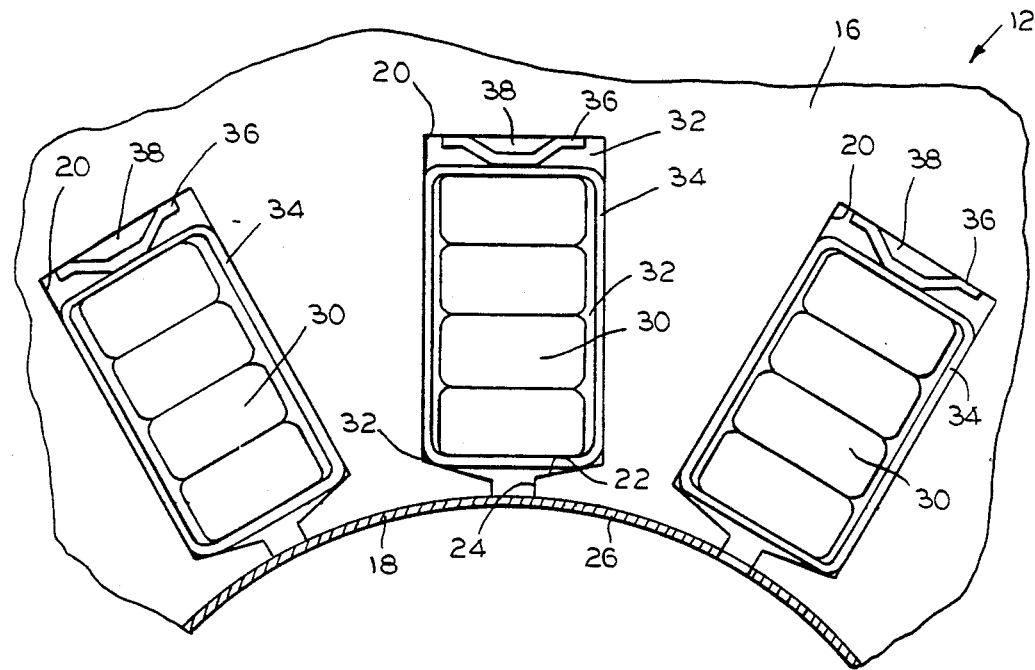
FIG. 2 is a sectional view taken along the line 2—2 of FIG. 1.

Extending longitudinally through the core 16 are a plurality of angularly spaced slots 20, see also FIG. 2. The slots 20 are generally rectangular in configuration and include a radially inwardly diverging portion 22 connected to a mouth 24 which opens radially inwardly to the bore 18. A cylindrical stator can 26 seals the bore to close off the mouth 24 of each slot 20.

The stator 12 also includes a stator coil, or armature winding, 28. The winding 28 comprises an electrical conductor 30 wound in the slots 20 in a conventional manner. For example, and as is particularly illustrated in FIG. 2, the conductor 30 is wound so that it extends longitudinally through each slot 20 four times. The conductor includes opposite end turns 32 and 34 to connect the portion of the wound conductor 30 extending through adjacent slots 20, as is well known.

Although in the illustrated embodiment, the conductor 30 is wound four times within each slot, the number of windings depends upon the nature of the particular machine, as is well known.

As is conventional, the size of the conductor 30 must be less than the size of the slot 20 in order to enable insertion during the manufacturing process. Consequently, the conductor 30, or multiple layers of the conductor 30, only partially fill each slot 20, to provide longitudinally extending spaces 32 surrounding the layers of conductor 30 in each slot 20.

Ordinarily, the alternating electromagnetic forces resulting from the alternating currents through the conductors 30 would cause vibration thereof. Typical prior art dynamoelectric machines impregnated the wound stator 12 with varnish to secure the conductors 30 against vibration. Without impregnation, there is sufficient space 32 to obtain necessary cooling oil flow rate to directly cool the conductors 30. In accordance with the invention, the conductors are mechanically secured within the slots 20 without the use of impregnation.

In order to insulate the conductors 30 in the core 16, the conductors 30 may have a layer of insulation thereon. Alternatively, or additionally, slot liners 34 protect the conductors 30 from damage caused by sharp edges of the laminated core 16.

In order to secure the conductors 30 against external vibration forces, such as machine vibration due to imbalance in rotation or lack of symmetry, and internal vibration forces, due to opposite magnetic fields in each conductor, elastic means are provided for biasing the conductors against movement in each of the slots 20. Specifically, a channel section spring wedge 36 is provided at the radially outermost portion of the slot 20 for biasing the conductors 30 radially inwardly against the diverging portion 22. The spring wedges 36 must be of high resistivity and provide sufficient elasticity at high temperature. The spring wedges 36 are referred to as channel wedges, as they define a longitudinally extending channel 38 for oil flow. The spring wedge 36 may extend longitudinally through the entire length of each slot 20, or may comprise a plurality of separate spring wedges longitudinally spaced in each slot 20, as necessary or desired.

With the use of the spring wedges 36, the conductors 30 are secured against movement within the slots 20. Thus, one of the benefits of impregnation is obtained. However, the manufacturing clearances, represented by the spaces 32, remain. Although varnish is a better heat conductor than air, it is less of a heat conductor than oil coolant. Therefore, the spaces 32 can be used as oil flow channels to provide direct cooling to the conductors.

With specific reference to FIG. 1, it can be seen that axially opposite chambers 40 and 42 within the housing 14, enclosing the end windings 32 and 34, respectively, are provided at opposite ends of the stator 12. An oil inlet port 44 opens into the chamber 40, while an oil outlet port 46 opens from the chamber 42. As is illustrated schematically, the port 44 is connected to an oil supply 48, while the outlet port 46 is connected to an oil return 50. Oil flow from the supply 48 enters the inlet port 44 into the first chamber 40. The oil in the chamber 40, as indicated by the arrows, passes through the stator slots 20, specifically the spaces 32 and channel 38, see FIG. 2, into the outlet chamber 42. Oil from the outlet chamber flows through the outlet port 46 to the oil return 50. Since the stator can 18 seals the slots 20 at the mouth 24, there is no leakage of oil into the rotor 19.

Thus, the oil cooling brings the oil into direct contact with the conductors 30 which are the primary heat producing parts in the stator 12. The use of direct cooling increases the efficiency of the machine 10. Specifically, the use of direct cooling increases the current density which allows a generator to be smaller for a particular application. This also allows greater design freedom for any given application.

Further, cost reductions are obtained by the elimination of the necessity to use back iron cooling, and also impregnation of the stator which can be quite expensive. Improved oil management is provided by the elimination of free oil in the generator's interior. Also, oil drag loss is eliminated.

Figure 3:
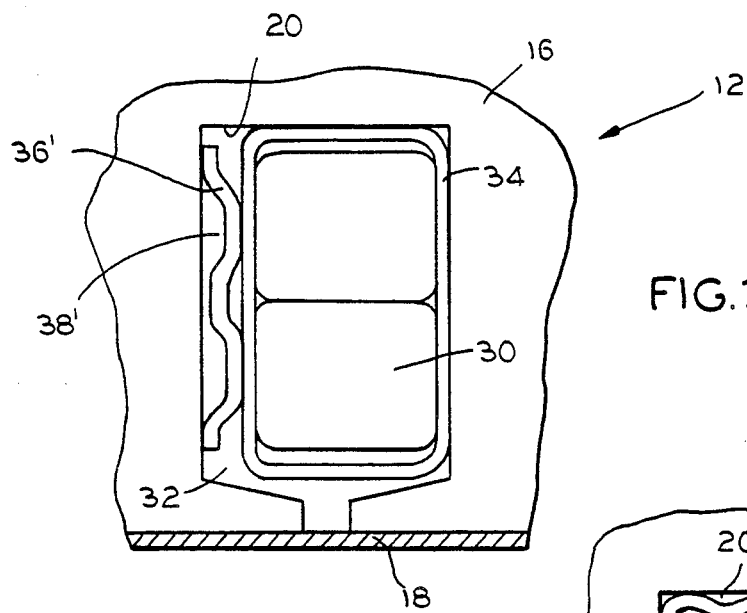
FIG. 3 is a sectional view, similar to that of FIG. 2, of a dynamoelectric machine having stator cooling apparatus according to an alternative embodiment of the invention.

With reference to FIG. 3, an elastic means 36' according to a first alternative embodiment of the invention is illustrated. The elastic means 36' is used in connection with a stator 12, similar to the stator 12 of FIGS. 1 and 2. Therefore, like reference numerals represent like elements.

The elastic means 36' differs from the elastic means 36 of FIG. 2 in that the elastic means 36' is disposed between the conductors 30 and a side wall of the slot 20. As a result, the elastic means 36' exerts an angular force for angularly biasing the conductors 30 extending through each slot 20. The elastic means 36' also comprises a channel spring wedge, owing to the channel 38' resulting therefrom. In all other respects, the cooling provided is similar to that discussed above relative to FIGS. 1 and 2.

Figure 4:
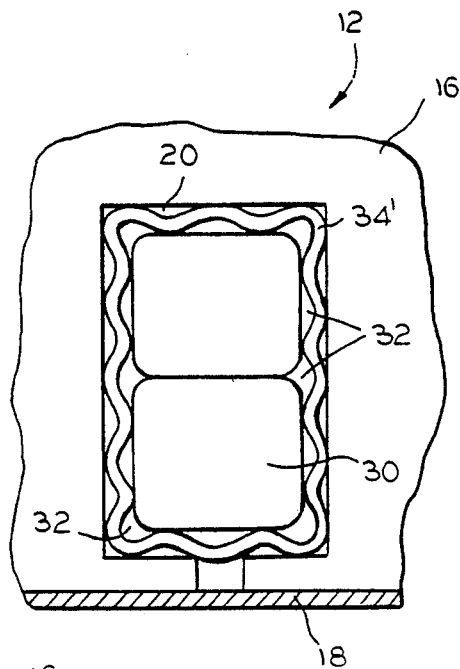
FIG. 4 is a sectional view, similar to that of FIG. 2, of a dynamoelectric machine having stator cooling apparatus for yet another alternative embodiment of the invention.

With reference to FIG. 4, yet another embodiment is illustrated. Specifically, in this third embodiment, the slot liner 34 of FIG. 2 is replaced with a corrugated slot liner 34'. Such a slot liner 34' is made of an elastic material. Deformation of the corrugated slot liner 34' on assembly provides the constraining forces on the conductors 30. The corrugations also provide the cooling oil channels 32 represented by the manufacturing clearances and the spaces provided between the slot and the conductor 30, as illustrated. In all other respects, cooling is similar to that described above relative to FIG. 1.

Figure 5:
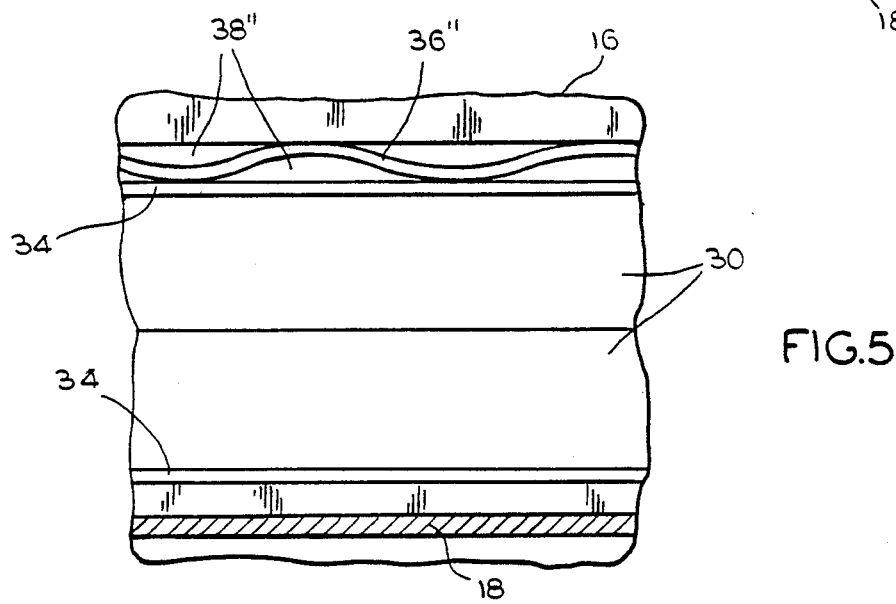
FIG. 5 is a sectional view, similar to that of FIG. 1, of a dynamoelectric machine having stator cooling apparatus according to yet a further embodiment of the invention.

With reference to FIG. 5, a spring wedge 36" according to yet another embodiment is illustrated. The spring wedge 36" differs from the spring wedges 36 and 36', see FIGS. 2 and 3, in that it comprises a wavy spring wedge extending longitudinally, as opposed to the channel section spring wedges shown in FIGS. 2 and 3. As with the embodiment in FIG. 2, the wavy spring wedge 36" exerts a radially inwardly directed force on the conductors 30. Although no longitudinally extending channels are provided adjacent the spring wedge 36", suitable laterally extending channels 38" are provided through which coolant oil may flow, providing cooling in addition to the flow through the spaces ,provided on either side or radially inwardly of the conductors 30, as discussed above. In all other respects, oil management is similar to that discussed above relative to FIG. 1.

Thus, in accordance with the invention, elastic means in the form of spring wedges or elastic slot liners are provided for securing conductors 30 against vibrational movement, while permitting the use of manufacturing clearances and tolerances within the slot 20 for providing a passage for flow of oil coolant to directly cool the conductors 30.

The disclosed embodiments are illustrative of the broad inventive concepts comprehended by the invention.

We claim:

1. A dynamoelectric machine comprising:
   a housing;
   an elongate cylindrical stator within said housing, and stator having a plurality of longitudinally extending, angularly spaced slots;
   a stator coil comprising an electrical winding having plural conductor portions wound in each said stator slot, whereby said conductor portions only partially fill said slots to provide longitudinally extending spaces along each conductor portion and between adjacent conductor portions in each of said slots;
   elastic means for biasing said conductor portions against movement in each of said slots; and
   means for providing liquid coolant to said stator so that the coolant flows through the spaces in said slots to provide direct cooling to said coil.

2. The dynamoelectric machine of claim 1 wherein said elastic means comprises a spring wedge associated with each said slot for radially inward biasing the conductor portions extending through such slot.

3. The dynamoelectric machine of claim 2 wherein each said spring wedge comprise an elongate wavy spring wedge.

4. The dynamoelectric machine of claim 1 wherein said elastic means comprises a spring wedge associated with each said slot for angularly biasing the conductor portions extending through such slot.

5. The dynamoelectric machine of claim 1 wherein said elastic means extend longitudinally through the length of each said slot.

6. The dynamoelectric machine of claim 1 wherein said elastic means comprises a corrugated slot liner surrounding the conductor portions extending through each said slot.

7. A stator cooled dynamoelectric machine comprising:
   a housing;
   an elongate cylindrical stator within said housing and having a central rotor receiving bore, said stator having a plurality of longitudinally extending, angularly spaced slots opening radially inwardly to said bore;
   a stator can sealing said bore to close off the radially inward openings from said slots;
   a stator coil comprising an electrical winding having plural conductor portions wound in each said stator slot, whereby said conductor portions only partially fill said slots to provide longitudinally extending spaces surrounding the conductor along each conductor portion and between adjacent conductor portions in each of said slots;
   elastic means for biasing said conductor portions against movement in each of said slots; and
   means for providing liquid coolant to said stator so that the coolant flows through the spaces in said slots to provide direct cooling to said coil.

8. The dynamoelectric machine of claim 7 wherein said elastic means comprises a spring wedge associated with each said slot for radially inwardly biasing the conductor portions extending through such slot.

9. The dynamoelectric machine of claim 8 wherein each said spring wedge comprise an elongate wavy spring wedge.

10. The dynamoelectric machine of claim 7 wherein said elastic means comprises a spring wedge associated with each said slot for angularly biasing the conductor portions extending through such slot.

11. The dynamoelectric machine of claim 7 wherein said elastic means extend longitudinally through the length of each said slot.

12. The dynamoelectric machine of claim 7 wherein said elastic means comprises a corrugated slot liner surrounding the conductor portions extending through each said slot.

* * * * *